Patented July 8, 1947

2,423,760

UNITED STATES PATENT OFFICE 2,423,760

METHOD OF POLYMERIZING ISOBUTYLENE

Norman M. Elmore, Elizabeth, N. J., assignor to Standard Oil Development Company, a corporation of Delaware No Drawing. Application May 26, 1942, Serial No. 444,571

4 Claims. (Cl. 260—94)

This invention relates to a method for polymerizing olefins; relates particularly to the polymerization of olefins at extremely low temperatures to yield high molecular weight polymers, and relates especially to means for mixing olefins and a polymerization catalyst under non-reactive conditions, and thereafter activating the catalyst to conduct the reaction after thorough mixing, in order to yield a higher molecular weight polymer of narrower molecular weight range.

It has been found that the iso-olefins, particularly isobutylene, when cooled to temperatures ranging from 0° C. down to −101° C. or even lower, to approximately −127° C. are readily polymerized by a Friedel-Crafts catalyst, such as boron trifluoride, into high molecular weight polymers which may have molecular weights ranging from 1,000 to 250,000 up to 500,000 or even higher. These polymers are linear chain hydrocarbon compounds which are rubbery in character. However, various difficulties are encountered in conducting the reaction. If gaseous boron trifluoride is used, difficulty is encountered in getting a sufficient quantity of the catalyst into the cold olefinic mixture to conduct the reaction to the desired high molecular weight polymers. Also, the polymerization tends to occur in the immediate neighborhood of the catalyst inlet, and tends to clog the catalyst inlet and arrest the reaction for lack of catalyst when the catalyst supply tube is closed by adherent polymer. Also, the heat of reaction from the polymerization is relatively high, being on the order of 11 to 12 kilo-calories per mole of olefinic material. In consequence, the relatively high concentration of catalyst at points near the catalyst inlet tends to give hot spots in the reaction mixture. Since the obtainable molecular weight is an inverse function of the temperature, such hot spots lead to the development of lower molecular weight polymers than is desired, and this may occur even though an internal refrigerant is used.

The present invention provides a new type of polymerization reaction, in which the catalyst is cooled to a temperature below its liquefaction point. At such temperatures, the liquid catalyst is soluble in the diluent-refrigerant, but inactive. The invention further provides a catalyst promoter which, when added to the solution of olefinic material, inert diluent and liquid catalyst, activates the reaction to cause the polymerization to occur rapidly and efficiently throughout the olefinic material.

Thus, the invention provides a new polymerization process, in which a mixture of diluent-refrigerant is prepared with the olefinic material to be polymerized and the catalyst, at a temperature below the liquefaction point of the catalyst; and the reaction is then initiated by the application, to the mixture, of a catalyst activator.

Other objects and details of the invention will be apparent from the following description:

In the cracking of petroleum to yield additional quantities of gasoline boiling range hydrocarbons, about 15% of the original crude oil appears as gaseous by-products, of which a considerable proportion is isobutylene. This is readily separated by refrigeration and fractional distillation in the form of a $C_4$ cut, from which the isobutylene is readily separated in a high degree of purity. This pure isobutylene is the raw material for the present invention. Likewise, considerable quantities of ethylene, ethane and methane are produced by the same cracking reaction, which also are readily separated from the gaseous by-products to serve as convenient refrigerant-diluents in the polymerization reaction.

In practicing the present invention, the isobutylene is preferably cooled with liquid ethylene to a temperature at or near the boiling point of liquid ethylene at −103° C. A convenient mixture utilizes 1 volume of isobutylene with from 3 to 6 volumes of liquid ethylene. Simultaneously, a composition of boron trifluoride in liquid ethylene is also prepared, the amount of liquid ethylene being a convenient portion of the amount to be added to the liquefied olefinic material. An amount of boron trifluoride is liquefied in and dissolved in the liquid ethylene, such as to amount to from 0.1% to 0.5% of the isobutylene to be polymerized. The mixture of isobutylene and liquid ethylene is then combined with the mixture of boron trifluoride and liquid ethylene. The resulting mixture does not polymerize. To this mixture there is then added a catalyst activator, such as ethyl ether, normal butyl alcohol, 2-nitro propane or tetra decanol or the like. The amount of catalyst activator to be added is relatively quite small, and may amount to only .001% to 1% of the amount of isobutylene used. That is, even on a plant scale a few drops of the catalyst promoter are all that are needed to initiate the reaction.

Example 1

A mixture was prepared consisting of 100 parts by volume of isobutylene of approximately 96% purity with 300 volumes of liquid ethylene. Simultaneously, a mixture consisting of 100 parts by volume of liquid ethylene and ½ part by volume of liquefied liquid boron trifluoride was prepared. The temperatures of these respective mixtures was found to lie between −101° C. and −103° C., the latter being the approximate boiling point under atmospheric pressure of liquid ethylene. In some instances, it is desirable to reduce this temperature somewhat by working under a slight vacuum. The essence of the invention utilizes the fact that at temperatures below its liquefaction point under atmospheric pressure, boron trifluoride is inactive as a polymerization catalyst. When the mixture was fully prepared and the catalyst and olefin were fully distributed throughout the mixture, approximately 0.001 part by volume of normal butyl alcohol was added to the mixture. The butyl alcohol was not necessarily cooled, but was added as a liquid at room temperature; this is desirable in view of the fact that the freezing point of normal butyl alcohol is considerably higher than the temperature of the reaction mixture. The reaction proceeded promptly to yield a very high molecular weight polymer of a degree of uniformity unobtainable by previous polymerization processes, this uniformity being probably due to the elimination of hot spots in the reaction mixture and the uniform dispersion throughout the mixture of both the iso-olefin and the catalyst; a condition unobtainable by any known prior procedure using boron trifluoride as a catalyst.

The resulting polymer showed a molecular weight of about 350,000, and a much greater uniformity of characteristics and molecular weight than is obtainable by any other process. In fact, the range of molecular weight of polymer molecules in this product is so narrow as to be difficult of separation by fractional precipitation methods, for which reason the exact range of molecular weight between the highest and the lowest molecular weights in the product is unknown.

Example 2

A mixture was prepared consisting of 100 parts by volume of liquid isobutylene, 250 parts by volume of liquid ethylene and 50 parts by volume of liquid methane, the mixture having a temperature under atmospheric pressure of approximately −115° C. Simultaneously, a mixture consisting of approximately 80 parts by volume of liquid ethylene, 20 parts by volume of liquid methane and 1 part by volume of liquid boron trifluoride was prepared. The two mixtures were then combined and stirred until a homogeneous mixture was obtained, no polymerization reaction being found to occur. When the mixture was thoroughly homogeneous, approximately ½ part by volume of 2-nitro propane was added. The reaction proceeded at once to the polymerization of the isobutylene to a high molecular weight polymer which, likewise, was of very narrow molecular weight range.

Example 3

A mixture was prepared consisting of 98 parts by volume of liquid isobutylene, 2 parts by volume of liquid isoprene, 250 parts by volume of liquid ethylene and 50 parts by volume of liquid methane. Simultaneously, a mixture was prepared consisting of 80 parts by volume of liquid ethylene, 20 parts by volume of liquid methane and 2 parts by volume of liquid boron trifluoride. These mixtures were combined and stirred until a thoroughly homogeneous mixture was obtained, no polymerization reaction occurring. Approximately ½ part by volume of tetra decanol was then added to the mixture. The reaction proceeded promptly to yield a high molecular weight interpolymerizate of the isobutylene and isoprene.

Example 4

A mixture was prepared consisting of approximately equal parts by volume of liquid isobutylene (boiling point −6° C.) and liquid ethane (boiling point −86° C.). This mixture was prepared in a reactor equipped with a refrigerant jacket containing liquid ethylene having a boiling point of −103° C. at atmospheric pressure, the mixture being cooled by the jacket to −103° C. To this mixture there was then added approximately 0.2% of boron trifluoride dissolved in 2 volumes of liquid ethane, this solution also being cooled to −103° C. The solution was then added at this low temperature to the mixture of isobutylene and ethane, with vigorous stirring, until a thoroughly homogeneous mixture was obtained. At this stage a small amount of ethyl ether was added, as in the previous examples. The ethyl ether initiated the reaction promptly and the polymerization proceeded to completion. In this instance initial cooling is used to inactivate the boron trifluoride and the liquid ethane is used to dissipate the heat of reaction, with the result that the resulting polymer is good, but of a lower molecular weight than that obtained when ethylene is used.

Example 5

A similar mixture was prepared as in Example 4, and placed in a similar jacketed reactor. In this instance, however, the reactor jacket was filled with liquid ethane, held under reduced pressure to obtain a temperature of approximately −105° C. at which temperature the reaction proceeds satisfactorily.

Example 6

A similar mixture was prepared as in Example 4, and placed in a similar jacketed reactor, except that the jacket was filled with liquid methane, which was held under sufficient pressure to bring its boiling point up to a temperature of −125° C. A temperature below −125° C. cannot be used because of the fact that boron trifluoride solidifies at −127° C. and at such temperatures the reactions tend to be different and difficultly controllable. In this instance also, the reaction proceeded rapidly and efficiently when started by the initiating substance and proceeded rapidly to completion. In this example, the pressure upon the liquid methane jacket was released, after the reaction had started, giving a much lower temperature in the jacket and greatly facilitating the transfer of heat from the reaction mixture to the jacket, thereby obtaining a much higher molecular weight polymer of narrower molecular weight range than was obtained in Example 4.

There is a considerable difference in the efficacy and utility of the various alcohols, ethers, esters, ketones and nitro-compounds, some being much more effective than others. The desirable alcohols consist of n-butyl alcohol, sec. amyl alcohol, 2-ethyl butyl alcohol, tetradecanol, sec. butyl alcohol and tert. butyl alcohol.

Other alcohols are less suitable for this purpose. Of the ethers the diethyl ether and the dimethyl ether are particularly satisfactory, while other ethers are less useful. Of the esters, isopropyl acetate is particularly effective, other esters being less suitable. Of the nitro compounds, 1-nitro and 2-nitro-propane are particularly useful, the other nitro-propanes being less efficient.

It has not been found possible as yet to determine what characteristics are of importance in the reaction initiating substance and accordingly all that is known in this regard is that some substances are more effective than others in certain definite reaction mixtures.

Thus, the invention provides a new type of low temperature polymerization reaction, in which the reactants, the diluent-refrigerant and the polymerization catalyst are mixed at a temperature below the liquefaction point of the catalyst and the reaction then initiated by the application to the mixture of an initiator.

While there are above disclosed but a limited number of embodiments of the invention, it is possible to provide still other embodiments without departing from the inventive concept herein disclosed, and it is therefore desired that only such limitations be imposed upon the appended claims as are stated therein or required by the prior art.

The invention claimed is:

1. In an olefinic polymerization process, the steps in combination of mixing a liquefied iso-olefin and a diluent-refrigerant at a temperature below $-101°$ C., adding thereto liquid boron trifluoride dissolved in a solvent, stirring the mixture until a homogeneous mixture is obtained without polymerization of the olefin, and then initiating the polymerization reaction by the application to the mixture of a reaction initiator, comprising butyl alcohol in an amount greater than 0.001% of the amount of isobutylene.

2. In an olefinic polymerization process, the steps in combination of mixing a liquefied iso-olefin and a diluent-refrigerant at a temperature below $-101°$ C., adding thereto liquid boron trifluoride dissolved in a solvent, comprising liquid ethylene, stirring the mixture until a homogeneous mixture is obtained without polymerization of the olefin, and then initiating the polymerization reaction by the application to the mixture of a reaction initiator, comprising butyl alcohol.

3. In an olefinic polymerization process, the steps in combination of mixing a liquefied iso-olefin and a diluent-refrigerant at a temperature below $-101°$ C., adding thereto liquid boron trifluoride dissolved in a solvent comprising liquid propane, stirring the mixture until a homogeneous mixture is obtained without polymerization of the olefin, and then initiating the polymerization reaction by the application to the mixture of a reaction initiator, comprising butyl alcohol.

4. In an olefinic polymerization process, the steps in combination of mixing a liquefied iso-olefin and a diluent-refrigerant at a temperature below $-101°$ C., adding thereto liquid boron trifluoride dissolved in a solvent comprising liquid methane, stirring the mixture until a homogeneous mixture is obtained without polymerization of the olefin, and then initiating the polymerization reaction by the application to the mixture of a reaction initiator, comprising butyl alcohol.

NORMAN M. ELMORE.

REFERENCES CITED

The following references are of record in the file of this patent:

UNITED STATES PATENTS

| Number | Name | Date |
|---|---|---|
| 2,291,510 | Thomas | July 28, 1942 |
| 2,300,069 | Skooglund | Oct. 27, 1942 |

FOREIGN PATENTS

| Number | Country | Date |
|---|---|---|
| 509,463 | Great Britain | July 17, 1939 |